(12) United States Patent
Fan et al.

(10) Patent No.: US 9,749,320 B2
(45) Date of Patent: Aug. 29, 2017

(54) METHOD AND SYSTEM FOR WIRELESS LOCAL AREA NETWORK USER TO ACCESS FIXED BROADBAND NETWORK

(71) Applicant: ZTE Corporation, Shenzhen (CN)

(72) Inventors: Liang Fan, Shenzhen (CN); Qiandeng Liang, Shenzhen (CN); Yong Chen, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 85 days.

(21) Appl. No.: 14/441,507

(22) PCT Filed: Sep. 17, 2013

(86) PCT No.: PCT/CN2013/083648
§ 371 (c)(1),
(2) Date: Jul. 2, 2015

(87) PCT Pub. No.: WO2014/107974
PCT Pub. Date: Jul. 17, 2014

(65) Prior Publication Data
US 2015/0295929 A1    Oct. 15, 2015

(30) Foreign Application Priority Data
Jan. 8, 2013 (CN) .......................... 2013 1 0006340

(51) Int. Cl.
*G06F 21/00* (2013.01)
*H04L 29/06* (2006.01)
(Continued)

(52) U.S. Cl.
CPC ........ *H04L 63/0892* (2013.01); *H04M 15/55* (2013.01); *H04M 15/8214* (2013.01);
(Continued)

(58) Field of Classification Search
CPC .................................................. H04L 63/0892
See application file for complete search history.

(56) References Cited

U.S. PATENT DOCUMENTS

| | | | |
|---|---|---|---|
| 7,065,341 B2 * | 6/2006 | Kamiyama | H04L 29/06 455/410 |
| 2007/0298760 A1 * | 12/2007 | Leis | H04L 63/08 455/404.1 |

(Continued)

FOREIGN PATENT DOCUMENTS

| | | |
|---|---|---|
| CN | 101106812 | 1/2008 |
| CN | 102740401 | 10/2012 |

(Continued)

OTHER PUBLICATIONS

3rd Generation Partnership Project. "Technical Specification Group Services and System Aspects; 3GPP system—fixed broadband access network interworking; Stage 2," Release 11 (2012).

(Continued)

*Primary Examiner* — Morshed Mehedi
(74) *Attorney, Agent, or Firm* — Foley & Lardner LLP

(57) ABSTRACT

A method and system for a wireless local area network user accessing a fixed broadband network, the method includes: a broadband network gateway (BNG) device initiating an identity authenticating process to an authentication authorization accounting (AAA) server for a wireless local area network (WLAN) user; after the AAA server successfully authenticates the WLAN user, the BNG device acquiring a mobility identifier of the WLAN user from the AAA server; after receiving the mobility identifier of the WLAN user, the BNG device allowing the mobility access of the WLAN user.

18 Claims, 7 Drawing Sheets

(51) Int. Cl.
*H04W 8/26* (2009.01)
*H04W 12/06* (2009.01)
*H04W 56/00* (2009.01)
*H04M 15/00* (2006.01)
*H04W 4/24* (2009.01)
*H04W 84/12* (2009.01)
*H04L 12/14* (2006.01)

(52) U.S. Cl.
CPC ............... *H04W 4/24* (2013.01); *H04W 8/26* (2013.01); *H04W 12/06* (2013.01); *H04W 56/00* (2013.01); *H04L 12/1407* (2013.01); *H04L 12/1435* (2013.01); *H04L 12/1439* (2013.01); *H04W 84/12* (2013.01)

(56) References Cited

U.S. PATENT DOCUMENTS

| | | | | |
|---|---|---|---|---|
| 2008/0281973 | A1* | 11/2008 | Yang | H04L 29/12273 709/228 |
| 2011/0134885 | A1* | 6/2011 | Wu | H04L 12/2859 370/331 |
| 2011/0151831 | A1* | 6/2011 | Pattabiraman | H04L 12/14 455/405 |
| 2013/0117451 | A1* | 5/2013 | Du | H04L 63/10 709/225 |
| 2013/0194917 | A1* | 8/2013 | Melsen | H04L 12/287 370/229 |
| 2014/0064188 | A1* | 3/2014 | D'Souza | H04W 88/16 370/328 |
| 2014/0071811 | A1* | 3/2014 | Niu | H04L 41/0893 370/221 |

FOREIGN PATENT DOCUMENTS

| | | | |
|---|---|---|---|
| CN | 102752746 | 10/2012 | |
| CN | WO 2012142867 A1 * | 10/2012 | ............ H04W 12/06 |
| CN | 102781093 | 11/2012 | |

OTHER PUBLICATIONS

3rd Generation Partnership Project. "Considerations of WLAN Offload," Proceedings of 3GPP TSG SA WG2 Meeting #86 (2011).
3rd Generation Partnership Project. "Technical Specification Group Services and System Aspects; Study on Support of BBF Access Interworking," Release 11 (2011).
Supplementary European Search Report dated Jan. 20, 2016, from related application No. 13870713.8.
International Search Report mailed Jan. 16, 2014, from related international application No. PCT/CN2013/083648 (3 pages).

* cited by examiner

METHOD AND SYSTEM FOR WIRELESS LOCAL AREA NETWORK USER TO ACCESS FIXED BROADBAND NETWORK

CROSS-REFERENCE TO RELATED APPLICATIONS

The present application is a U.S. National Phase of International Patent Application No. PCT/CN2013/083648, filed Sep. 17, 2013, which claims priority from Chinese Patent Application No. 201310006340.0, filed Jan. 8, 2013. The contents of these applications are incorporated herein by reference in their entirety.

TECHNICAL FIELD

The present document relates to the field of communications, and more particularly, to a method and system for a wireless local area network user accessing a fixed broadband network.

BACKGROUND

Along with the rapid development of Internet applications and intelligent terminals, the user needs of accessing to the Internet through a variety of intelligent terminals such as smart phones, tablet computers, and so on, so as to work, communicate and entertain anytime and anywhere are also very popular, the user accessing a network via the wireless local access network (WLAN) is one of the most important means.

FIG. 1 is a schematic diagram of the topology of a WLAN in the related art. As shown in FIG. 1, a conventional WLAN comprises access points (AP), access controllers (AC), an authentication and authorization and accounting (AAA) server, and other network elements, the user terminal device can access the network via the AP and AC after passing the authentication by the AAA server, the AC manages and controls the AP device via the control and provisioning of wireless access points (CAPWAP) protocol. With the trend and development of network integration, the integration of the WLAN network and the fixed broadband network has become one of the main trends of the future. FIG. 2 and FIG. 3 are schematic diagrams of network topology in a mode of integrating the WLAN and the fixed broadband network in the related art. As shown in FIG. 2 and FIG. 3, the various types of user terminals access the fixed broadband network via the WLAN network and the wired link, and the user authentication and service control are systematically executed by the broadband network gateway (BNG), while the AC device in the WLAN network is only responsible for the management and service configuration of the AP device, one AC device or a "AC cloud" manages a plurality of AP devices which are respectively linked to the upper-layer network through different BNGs. Meanwhile, because of the large area penetration and rapid deployment of the WLAN hotspot area networks, the needs for the mobile terminals accessing the network services via the WLAN in mobile scenarios are also increasing, the WLAN hotspot area networks need to support the user-based roaming and mobility capability. In the current broadband access network, however, in order to prevent problems such as account theft and remote login, the identification information (account number, password) of the fixed broadband user is bound with the user location information during the authentication, and the user location information is added by the access network device (such as OLT, DSLAM, Ethernet switch, and so on), the terminal cannot fake. Regardless of whether binding the user location information to authenticate or not, when a fixed broadband user successfully passes authentication and accesses, the user's access location information is also confirmed, the user cannot constantly access the network in the case that the location moves, or the access location information changes. This results in that, in a network environment where the fixed broadband users and the WLAN users coexist, the existing BNG device cannot effectively distinguish these two types of users and is unable to provide the mobility access capability for the WLAN users.

SUMMARY

The present document provides a method and system for a wireless local area network user accessing a fixed broadband network, and the technical problem to be solved is that, how to achieve a mobility access of a WLAN user in a network environment where fixed broadband users and WLAN users coexist.

To solve the abovementioned technical problem, the present document provides the following technical scheme:

a method for a wireless local area network user accessing a fixed broadband network, comprising:

a broadband network gateway (BNG) device initiating an identity authentication process to an authentication authorization accounting (AAA) server for a wireless local area network (WLAN) user;

after the AAA server successfully authenticates the WLAN user, the BNG device acquiring a mobility identifier of the WLAN user from the AAA server;

the BNG device allowing the mobility access of the WLAN user after receiving the mobility identifier of the WLAN user.

Preferably, the method further has the following feature: the AAA uses any of the following modes, comprising Extensible Authentication Protocol (EAP) authentication, Point to Point Protocol (PPP) authentication and Portal authentication, to authenticate the WLAN user.

Preferably, the method further has the following feature: the mobility identifier is carried in an authentication success message or an authorization message.

Preferably, the method further has the following feature: the BNG device communicates with the AAA server based on a Radius protocol, Diameter protocol or Tacacs protocol.

Preferably, the method further has the following feature: allowing the mobility access of the WLAN user, comprising:

after receiving a data packet, identifying out that the data packet is of the WLAN user based on identification information in the data packet, and forwarding the data packet.

Preferably, the method further has the following feature: the identification information comprises at least one of a Medium Access Control (MAC) address, an IP address, and a Point to Point Protocol over Ethernet (PPPoE) Session ID.

Preferably, the method further has the following feature: allowing the mobility access of the WLAN user, comprising:

allowing the WLAN user to move within a coverage range of the same service line card of the BNG device; or, allowing the WLAN user to move within a coverage range of all service line cards of the BNG device; or, allowing the WLAN user to move within a coverage range of the BNG device and another BNG device which is a mutual backup of the BNG device; or, allowing the WLAN user to move within the BNG pool or BNG cloud.

Preferably, the method further has the following feature: the movement of the WLAN user within the coverage range of the BNG device and another BNG device which is a mutual backup device of the BNG can be achieved through a synchronization message between the BNG devices.

Preferably, the method further has the following feature: allowing the WLAN user to move within the BNG pool or the BNG cloud through a synchronization mechanism within the BNG pool or the BNG cloud.

Preferably, the method further has the following feature: after allowing the mobility access of the WLAN user, further comprising:

after detecting that the WLAN user moves, the BNG device constantly billing the user by time and/or by traffic, and carrying at least one of the following information, including new user location information, new BNG user-side physical port information and new BNG user-side logical interface information, of the WLAN user in a billing packet of the WLAN user and sends it to a billing server.

A system for a wireless local area network user accessing a fixed broadband network, comprising a BNG device, wherein the BNG device comprises:

a triggering device, configured to: initiate an identity authentication process to an authentication authorization accounting (AAA) server for a wireless local area network (WLAN) user;

an acquiring device, configured to: the BNG device acquires the mobility identifier of the WLAN user from the AAA server after the AAA server successfully authenticates the WLAN user;

a controlling device, configured to: connect to the acquiring device, and allow the mobility access of the WLAN user after receiving the mobility identifier of the WLAN user.

Preferably, the system further has the following feature: the AAA uses any of the following modes, comprising EAP authentication, PPP authentication and Portal authentication, to authenticate the WLAN user.

Preferably, the system further has the following feature: the mobility identifier is carried in an authentication success message or an authorization message.

Preferably, the system further has the following feature: the BNG device communicates with the AAA server based on a Radius protocol, Diameter protocol or Tacacs protocol.

Preferably, the system further has the following feature: the controlling device is configured to: after receiving a data packet, identify out the data packet is of the WLAN user and forward the data packet based on identification information in the data packet.

Preferably, the system further has the following feature: the identification information comprises at least one of a MAC address, an IP address, and a PPPoE Session ID.

Preferably, the system further has the following feature: the controlling device is configured to: allow the mobility access of the WLAN user, comprising:

allowing the WLAN user to move within a coverage range of the same service line card of the BNG device; or, allowing the WLAN user to move within a coverage range of all service line cards of the BNG device; or, allowing the WLAN user to move within a coverage range of the BNG device and another BNG device which is a mutual backup of the BNG device; or, allowing the WLAN user to move within the BNG pool or the BNG cloud.

Preferably, the system further has the following feature: the movement of the WLAN user within the coverage range of the BNG device and another BNG device which is a mutual backup device of the BNG can be achieved with a synchronization message between the BNG devices.

Preferably, the system further has the following feature: allowing the WLAN user to move within a BNG pool or a BNG cloud according to a synchronization mechanism within the BNG pool or the BNG cloud.

Preferably, the system further has the following feature: the BNG device further comprises:

a billing device, configured to: after detecting that the WLAN user moves, keep billing the user by time and/or by traffic, and carry at least one of the following information, including new user location information, new BNG user-side physical port information and new BNG user side logical interface information, of the WLAN user in a billing packet of the WLAN user and send it to the billing server.

The embodiments provided in the present document provides a method and system for supporting the mobility access capability in a scenario that the WLAN user accesses the fixed network by extending the existing technologies and network devices, so as to achieve the roaming capability when the WLAN user accesses from the fixed broadband network.

PREFERRED EMBODIMENTS OF THE DOCUMENT

Hereinafter in conjunction with the accompanying drawings and specific embodiments, the present document will be described in further detail. It should be noted that, in the case of no conflict, the embodiments and features in the embodiments of the present application may be arbitrarily combined with each other.

Figure 1:
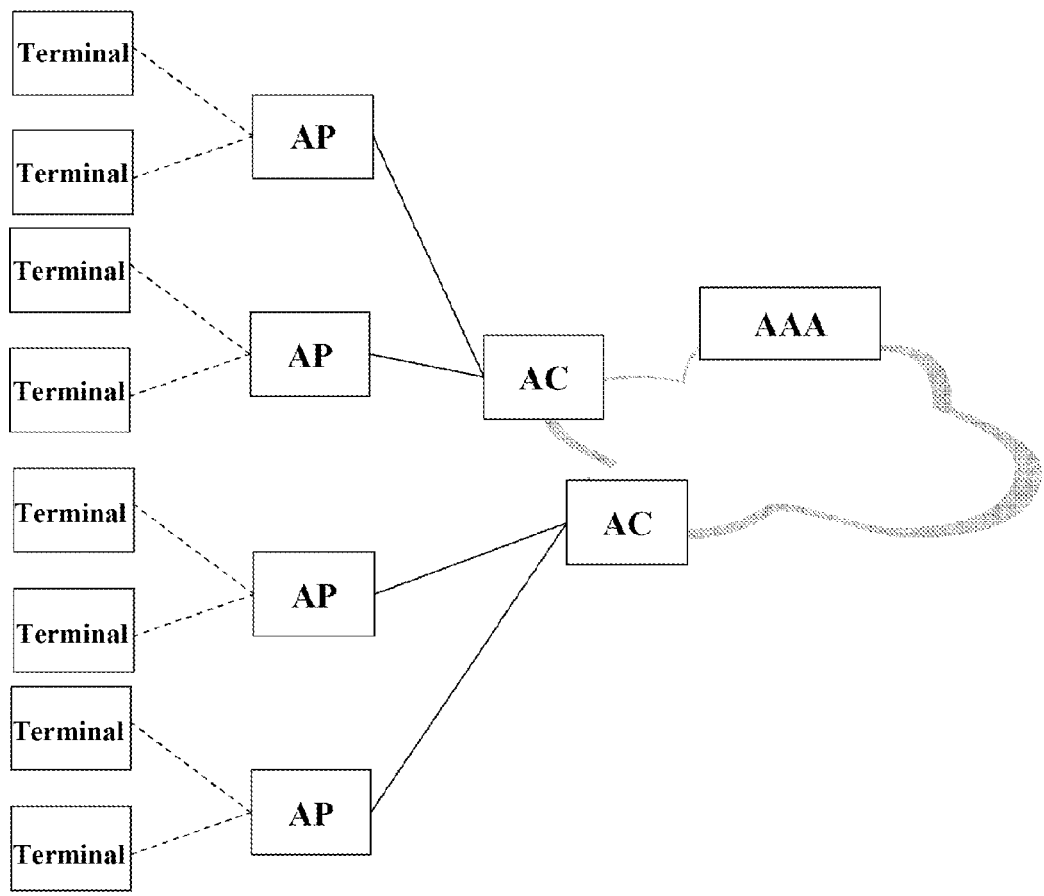
FIG. 1 is a schematic diagram of the topology of a WLAN network in the related art.
Figure 2:
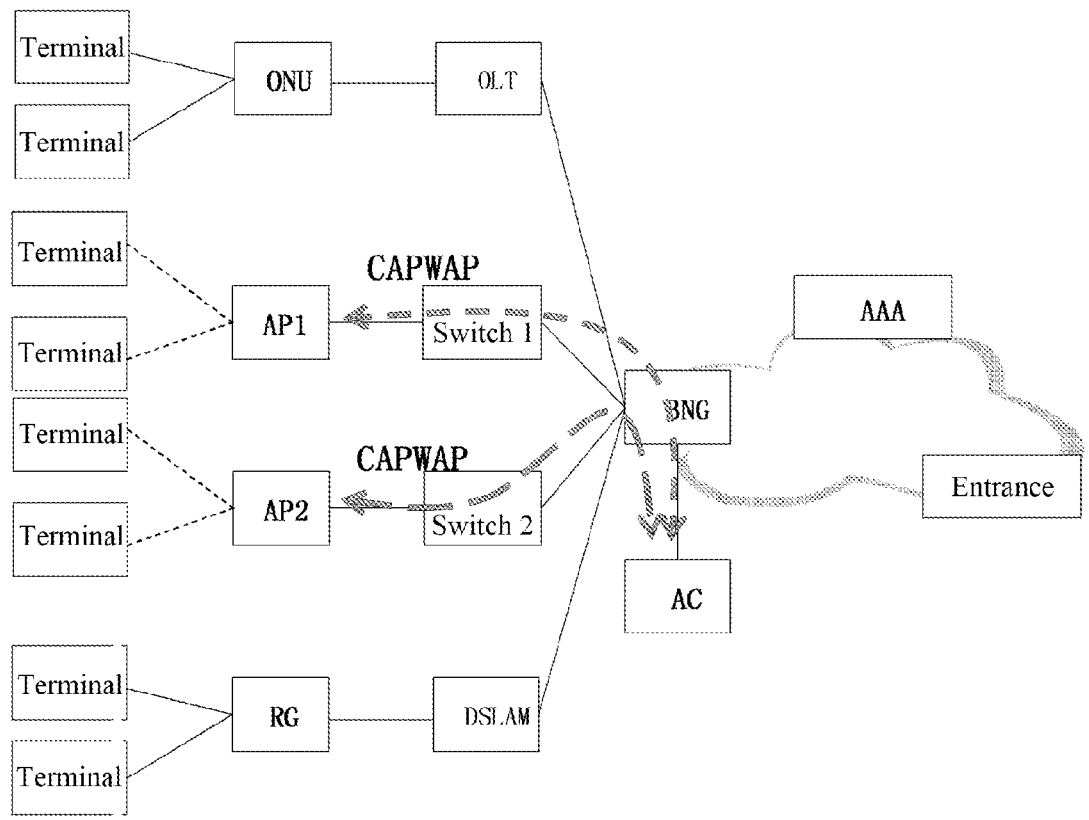
FIG. 2 is a schematic diagram of a network topology in a mode of integrating the WLAN and the fixed broadband network in the prior art.
Figure 3:
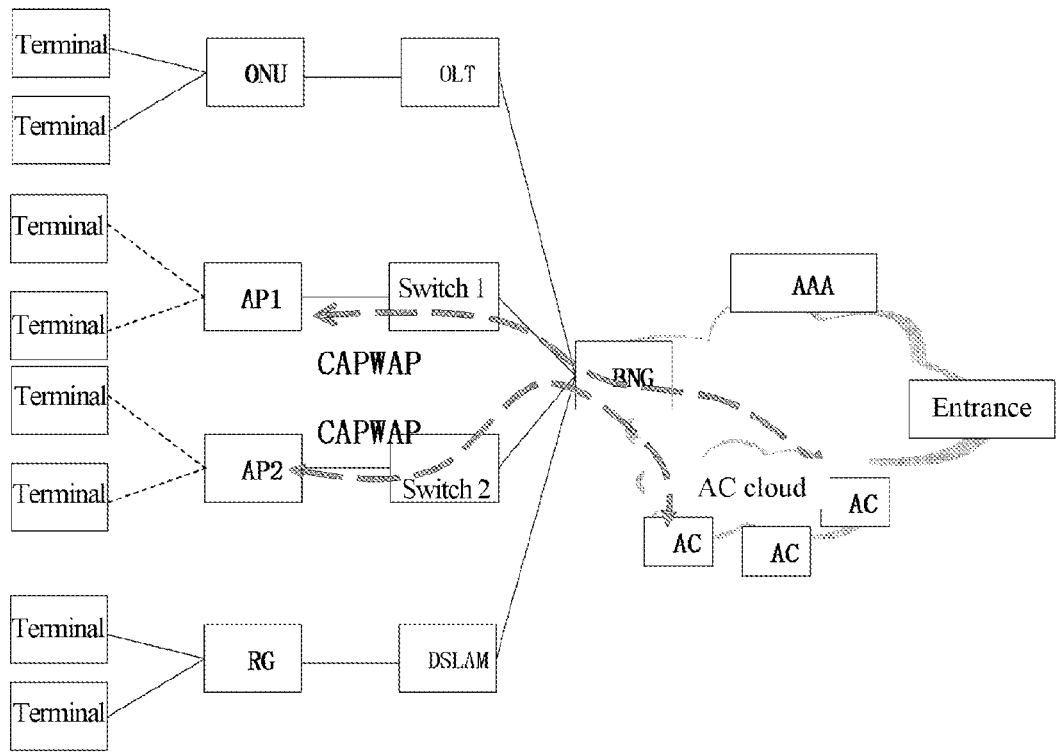
FIG. 3 is a schematic diagram of another network topology in a mode of integrating the WLAN and the fixed broadband network in the prior art.
Figure 4:
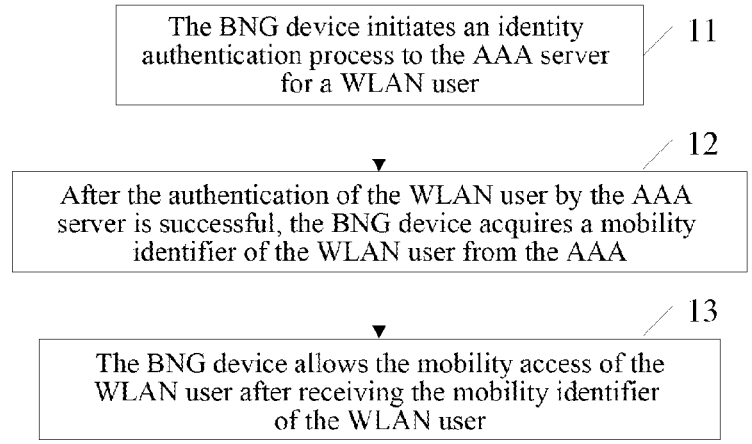
FIG. 4 is a schematic diagram of the process of a method embodiment for a wireless local area network user accessing a fixed broadband network provided in the present document.

FIG. 4 is a schematic diagram of the process of a method embodiment for a wireless local area network user accessing a fixed broadband network provided in the present document. The method embodiment shown in FIG. 4 comprises the following steps.

In step 11, the BNG device initiates an identity authentication process to an AAA server for a WLAN user.

In step 12, after the AAA server successfully authenticates the WLAN user, the BNG device acquires a mobility identifier of the WLAN user from the AAA.

In step 13, the BNG device allows the mobility access of the WLAN user after receiving the mobility identifier of the WLAN user.

In a network environment where the fixed broadband users and the WLAN users coexist, when detecting a WLAN user accessing the network, the BNG device initiates an identity authentication for the WLAN user, then acquires the mobility identifier of the WLAN user from the AAA server, thereby managing the mobility access according to the mobility identifier, and realizing the roaming capability when the WLAN user accesses from the fixed broadband network.

Wherein, the AAA uses any of the following modes, comprising Extensible Authentication Protocol (EAP) authentication, Point to Point Protocol (PPP) authentication and Portal authentication, to authenticate the WLAN user.

In the abovementioned step 12, the mobility identifier is carried in an authentication success message or an authorization message, and of course, a new message can also be newly defined to specifically send the mobility identifier.

Wherein, the BNG device communicates with the AAA server based on the Radius protocol, the Diameter protocol or the Tacacs protocol.

Said allowing the mobility access of the WLAN user in step 13 comprises:

after receiving a data packet, identifying out that the data packet is of the WLAN user based on the identification information in the data packet, and forwarding the data packet.

wherein, the identification information comprises at least one of a MAC address, an IP address and a PPPoE Session ID.

In a practical application, one alone can be used to determine, but using a combination of two or more of the abovementioned identities to determine can enhance safety and reduce ambiguity.

Wherein, allowing the mobility access of the WLAN user comprises:

allowing the WLAN user to move within the coverage range of the same service line card of the BNG device; or, allowing the WLAN user to move within the coverage range of all service line cards of the BNG device; or, allowing the WLAN user to move within the coverage range of the BNG device and another BNG device which is a mutual backup of the BNG device; or, allowing the WLAN user to move within the BNG pool or the BNG cloud.

wherein, the movement of the WLAN user within the coverage range of the BNG device and another BNG device which is a mutual backup device of the BNG can be achieved with a synchronization message between the BNG devices, and, allowing the WLAN user to move within the BNG pool or the BNG cloud according to the synchronization mechanism in the BNG pool or the BNG cloud.

After allowing the mobility access of the WLAN user, further comprising:

after detecting that the WLAN user moves, the BNG device keeps billing the user by time and/or by traffic, and carries at least one of the following information, including new user location information, new BNG user-side physical port information and new BNG user side logical interface information, of the WLAN user in a billing packet of the WLAN user and sends it to the billing server, so that the billing server can accurately record the online time length and traffic of the user according to the billing message.

In the following, three embodiments are used to further explain the method provided in the present document.

The First Embodiment

Figure 5:
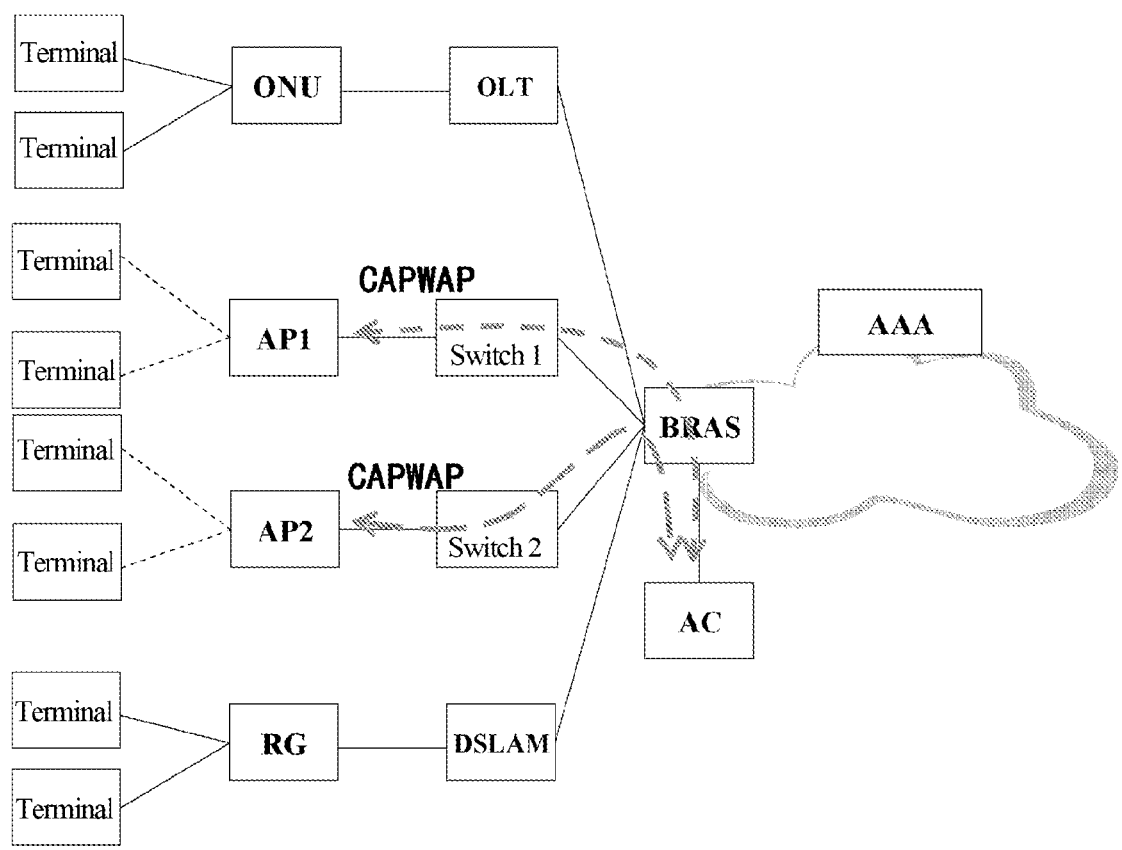
FIG. 5 is a schematic diagram of the network topology in accordance with a first embodiment.
Figure 6:
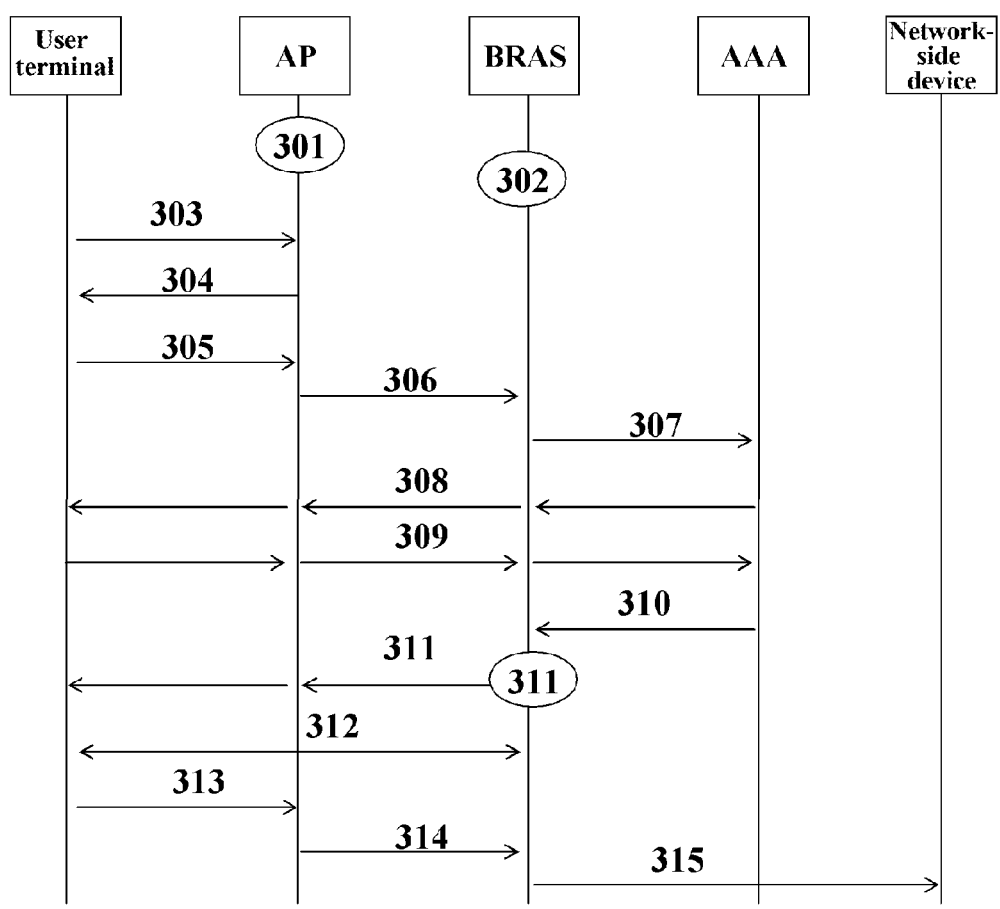
FIG. 6 is a schematic diagram of the process in accordance with the first embodiment.

As shown in FIG. 5, the AP is connected to the AC/AC cloud via the BRAS device, the AC/AC cloud controls that packets of the AP are forwarded through the BRAS, the packet of the user for accessing the network side does not go through the AC. The user is authenticated via the EAP MD5, and obtains an IP address via the DHCP. As shown in FIG. 6, the following are included.

In step 301, configure the AP device as a remote authentication dial-in user service (Radius) client, and configure the address of a broadband remote access server (BRAS) as the address of the AP's Radius Server.

In step 302, configure the BRAS as a Radius Client, and configure the AAA device as the BRAS's Radius Server.

In step 303, the user terminal sends an EAPoL-Start request to the AP1.

In step 304, the AP1 sends an EAP-Request/Identity message to the user terminal after receiving the EAPol-Start message, and requires the user terminal to send the user name to the AP.

In step 305, the user terminal sends the EAP-Response/Identity message to the AP1, wherein the message comprises the user name.

In step 306, the AP1 encapsulates the EAP-Response/Identity message into a RADIUS Access-Request message and sends it to the BNG.

In step 307, the BRAS re-encapsulates the received Radius Access-Request message and sends it to the AAA.

In step 308, the AAA generates a Challenge, and sends the RADIUS Access-Challenge message to the user terminal through the BRAS and the AP1, wherein the EAP-Request/MD5-Challenge is comprised.

In step 309, after receiving the EAP-Request/MD5-Challenge packet, the user terminal performs MD5 algorithm on the password and the Challenge to obtain a Challenged-Password, which is carried in the EAP-Response/MD5-Challenge message and sent to the AP1, the AP1 sends the Challenge, the Challenged Password and the user name to the BRAS, and the BRAS re-encapsulates and sends them to the AAA.

In step 310, the AAA performs the MD5 algorithm according to the user information, and judges whether the user is legitimate or not, and judges whether to provide the mobility access capability for the WLAN user or not, then sends an authentication success/failure message to the BRAS. If the authentication is successful and the WLAN user is allowed to perform mobility access in the network, the mobility identifier is carried in the authentication success message; if the authentication fails, the process ends here.

In step 311, the BRAS sends an authentication success message to the user terminal through the AP1, meanwhile the BRAS enables all the local line cards in the user side to support the mobility access of the user.

In step 312, the user terminal applies for an IP address from the BRAS through the DHCP protocol.

Furthermore, the BNG can assign an IP address to the user from the local, or the BNG assigns an IP address to the user via the DHCP server.

In step 313, the user accesses the network from the AP2 and sends data packets.

In step 314, the AP2 sends the user's data packets to the BRAS.

Furthermore, the AP2 can discover that the newly accessed user is successfully authenticated via the AC/AC cloud or the BRAS device or the universal PMK key.

In step 315, the BRAS receives the user's data packets from different physical ports/logical interfaces at the user side, and determines that the user who sends the data packets is a user who is allowed with the mobility access based on the MAC address and the IP address of the data packets, and forwards the user's data packets to the network side.

Furthermore, for a BRAS device with a distributed architecture, if the forwarding plane of the line cards of the BRAS device at the user side does not have the user's data, then further check whether the user has a mobility access authority or not via the line card controlling plane or a master controlling card plane.

Furthermore, after the user who is allowed with the mobility access changes the accessing physical port/logical interface, the BRAS still can keep billing (by traffic and/or by time length) the user's data packets, and carry the new user location information and/or the new BNG user-side physical port and/or logical interface information into a billing packet.

The Second Embodiment

Figure 7:
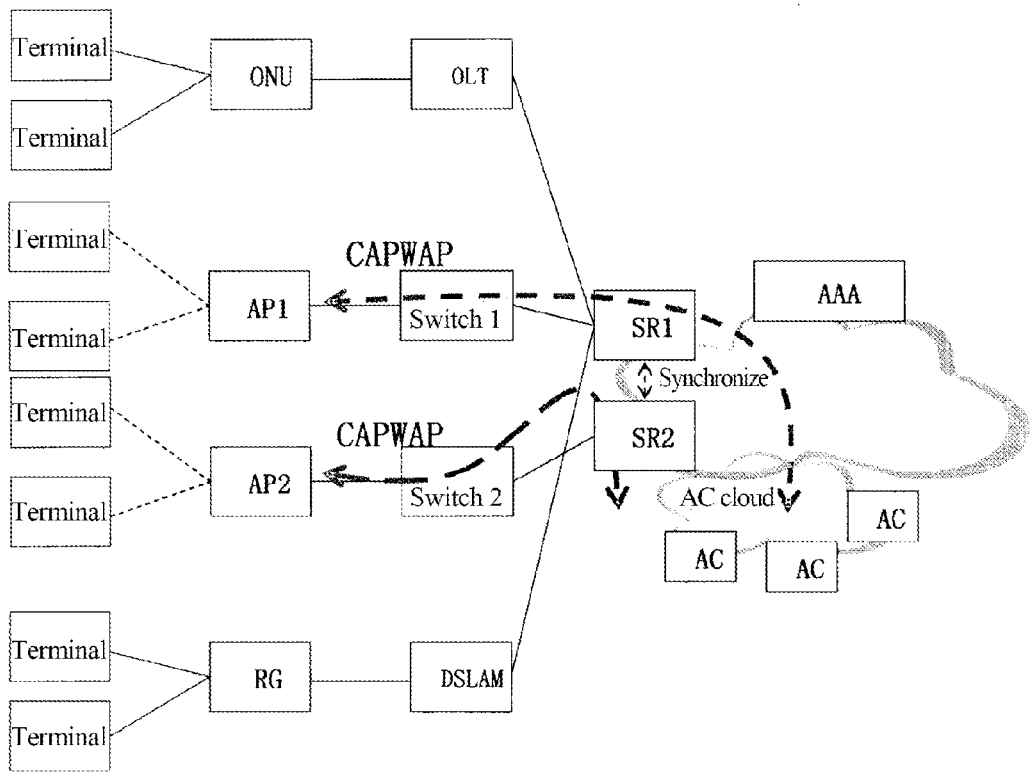
FIG. 7 is a schematic diagram of a network topology in accordance with a second embodiment.
Figure 8:
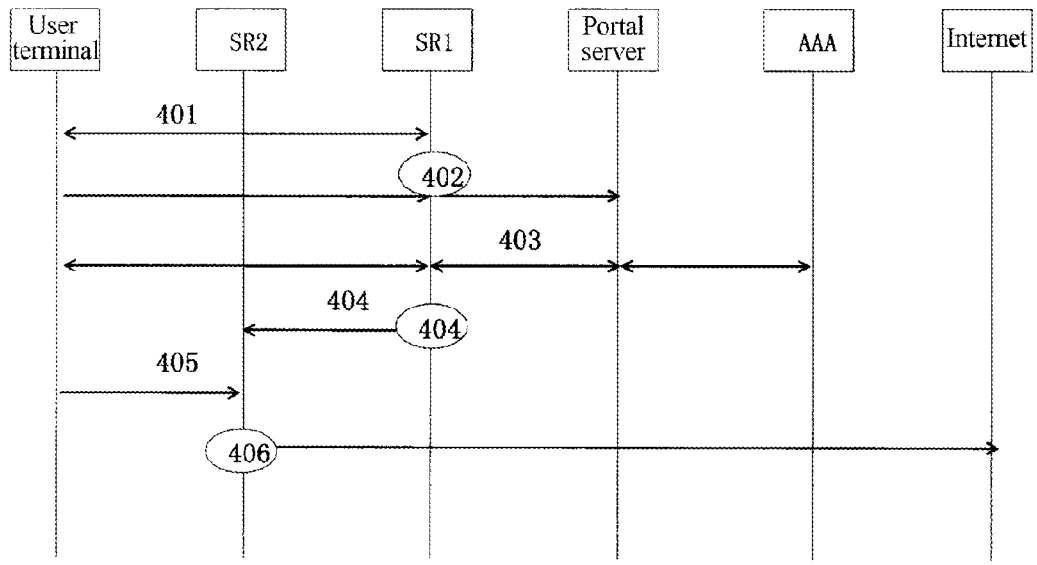
FIG. 8 is a schematic diagram of the process in accordance with the second embodiment.

As shown in FIG. 7, the AP and the AC are connected with each other via the SR device, the AC controls to forward the AP packet via the SR, the packets of the user accessing the network side do not go through the AC. The user obtains the address via the DHCP protocol and authenticates via the Portal protocol, the SR1 and the SR2 are mutual backups of each other. As shown in FIG. 8, the following steps are comprised.

In step 401, the user terminal obtains an IP address from the SR1 through the DHCP protocol, and the DHCP packets are forwarded through the AP1.

In step 402, before the authentication, the packets of the user terminal accessing the network side pass through the SR1 device and are redirected to the Portal server.

In step 403, the user authentication is performed between the user terminal, the Portal Server, the SR1 and the AAA through the Portal authentication/Web authentication process. Wherein, the AAA judges whether the user is legitimate or not according to the user name and password input by the user on the Portal page, and judges whether to provide the mobility access capability for the WLAN user or not. Then an authentication success/failure message is sent to the SR1. If the authentication is successful and the WLAN user is allowed to perform mobility access in the network, the mobility identifier is carried in the authentication success message; if the authentication fails, the process ends here.

In step 404, after the user is authenticated successfully, the SR1 enables all the local line cards at the user side to support the user's mobility access, meanwhile sends the user information and the mobility identifier to the SR2 via the synchronizing message between the SR1 and the SR2.

In step 405, the user accesses the network from the AP2 and sends a data packet, and the AP2 sends the user's data packet to SR2.

In step 406, the SR2 receives the user's data packet from the physical port/logical interface at the user side, and judges whether the user who sends the data packet is a user who is allowed with the mobility access or not according to the MAC address and the IP address of the data packet, and forwards the user's data packet to the network side.

Furthermore, after the user who is allowed with mobility access replaces the SR device and accesses, the SR after the replacement still can keep billing (by traffic and/or time length) the user's data packets. Moreover, the new user location information and/or the new BNG user side physical port and/or logical interface information are carried in a new billing packet.

The Third Embodiment

Figure 9:
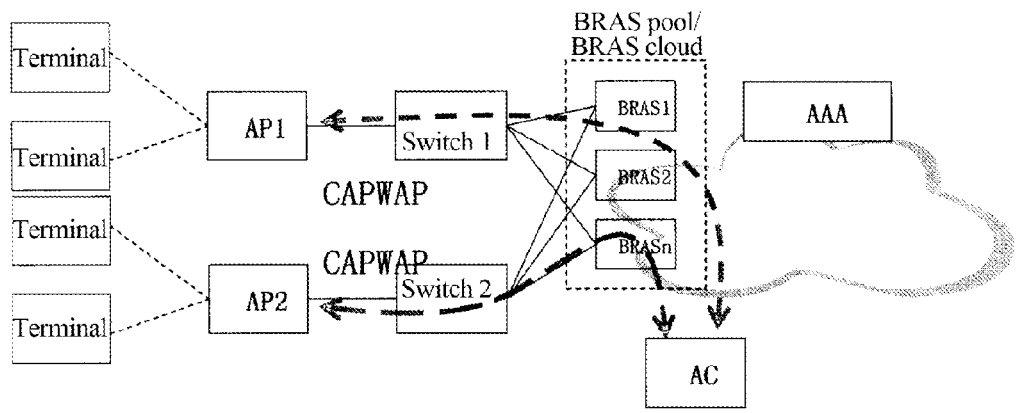
FIG. 9 is a schematic diagram of a network topology in accordance with a third embodiment.
Figure 10:
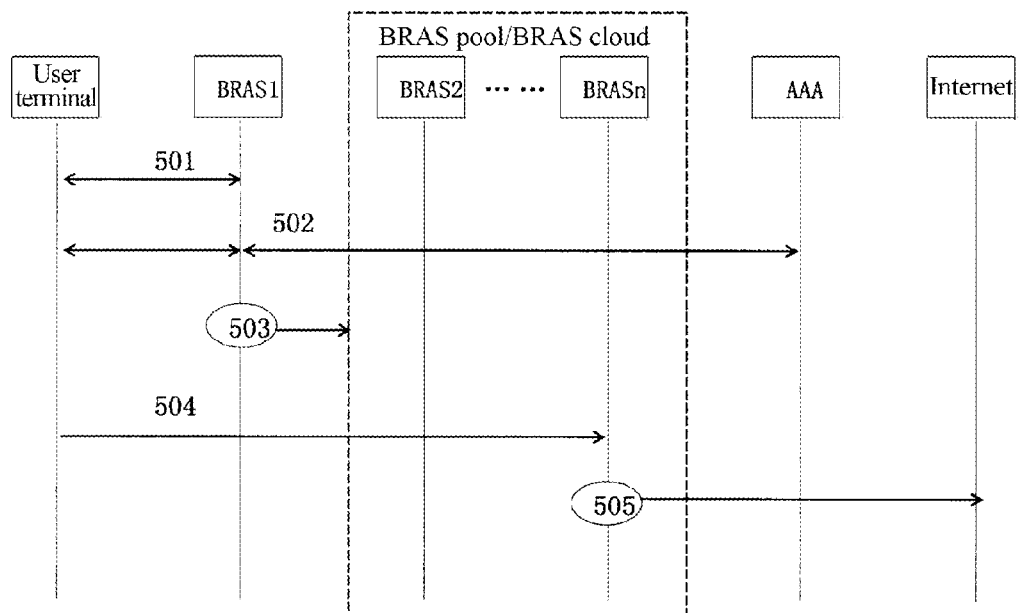
FIG. 10 is a schematic diagram of the process in accordance with the third embodiment.

As shown in FIG. 9, the AP and the AC are connected with each other via the SR device, the AC controls the AP packet to be forwarded via the SR, the packet of the user accessing the network side does not go through the AC. The user obtains an address through the PPPoE authentication, and a plurality of BRAS devices are formed into a BRAS Pool or a BRAS Cloud. As shown in FIG. 10, the following steps are comprised.

In step 501, the user terminal accesses via the PPPoE mode and performs the PPPoE negotiation (negotiating the PPPoE Session ID) and the PPP LCP negotiation (negotiating the authentication mode) with the BRAS1.

In step 502, the user terminal and the BRAS1 device enter into the PPP authentication phase, the user identification information is authenticated completely between the BRAS1 and the AAA; the AAA judges whether the user is legitimate or not based on the user name and the password, and judges whether to provide the mobility access capability for the WLAN user or not. Then an authentication success/failure message is sent to the SR1. If the authentication is successful and the WLAN user is allowed to perform mobility access in the network, the mobility identifier is carried in the authentication success message. If the authentication fails, the process ends here.

In step 503, after the user is successfully authenticated, the BRAS1 enables all the local line cards at the user side to support the user's mobility access, meanwhile the synchronization mechanism within the BRAS Pool or BRAS Cloud is used to synchronize the user information and the user's mobility identifier to other BRAS devices.

In step 504, the user accesses the network from the AP2, and sends a data packet, the AP2 sends the user's data packet to the BRASn.

In step 505, the BRASn receives the user's data packet from the physical port/logical interface at the user side, judges whether the user who sends the data packet is a user who is allowed with the mobility access or not according to the MAC address and/or the IP address and/or the PPPoE Session ID of the data packet, and forwards the user's data packet to the network side.

Furthermore, after the user who is allowed with the mobility access changes a BRAS device to access, the BRAS after the change can still keep billing (by traffic and/or time length) the user's data packets. Moreover, the new user location information and/or the new BNG user-side physical port and/or logical interface information are carried in the new billing packet.

Figure 11:
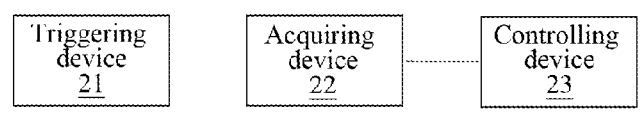
FIG. 11 is a structural diagram of a system embodiment for a wireless local area network user accessing a fixed broadband network provided in the present document.

FIG. 11 is a structural diagram of a system embodiment for a wireless local area network user accessing a fixed broadband provided in the present document. The system comprises a BNG device, wherein the BNG device comprises:

triggering device 21, used to initiate an identity authentication process to an authentication authorization accounting (AAA) server for a wireless local area network (WLAN) user;

acquiring device 22, used to, after the AAA server successfully authenticates the WLAN user, the BNG device acquires the mobility identifier of the WLAN user from the AAA;

controlling device 23, connected with the acquiring device 22, and used to allow the mobility access of the WLAN user after receiving the mobility identifier of the WLAN user.

Wherein, the AAA uses any of the following modes, comprising EAP authentication, PPP authentication and Portal authentication, to authenticate the WLAN user.

Wherein, the mobility identifier is carried in an authentication success message or an authorization message.

Wherein, the BNG device communicates with the AAA server based on the Radius protocol, the Diameter protocol or the Tacacs protocol.

Wherein, the controlling device is used to, after receiving a data packet, identify out that the data packet is of the WLAN user according to the identification information in the data packet, and forward the data packet.

Wherein, the identification information comprises at least one of the MAC address, the IP address, and the PPPoE Session ID.

Wherein the controlling device allows the mobility access of the WLAN user, comprising:

allowing the WLAN user to move within a coverage range of the same service line card of the BNG device; or, allowing the WLAN user to move within a coverage range of all service line cards of the BNG device; or, allowing the WLAN user to move with a coverage range of the BNG device and another BNG device which is a mutual backup of the BNG device; or, allowing the WLAN user to move within the BNG pool or the BNG cloud.

Wherein, the movement of the WLAN user within the coverage range of the BNG device and another BNG device that is a mutual backup of the BNG device can be achieved with a synchronization message between the BNG devices.

wherein, allowing the WLAN user to move within the BNG pool or the BNG cloud through the synchronization mechanism within the BNG pool or the BNG cloud.

wherein, the BNG device further comprises:

a billing device, used to: after detecting that the WLAN user moves, keep billing the user by time and/or by traffic, and carry at least one of the following information, including new user location information, new BNG user-side physical port information and new BNG user-side logical interface information, of the WLAN user in a billing packet of the WLAN user and sends it to the billing server.

Those ordinarily skilled in the art can understand that all or some of the steps of the abovementioned embodiments may be implemented using a computer program process, and the computer program may be stored in a computer-readable storage medium and executed on an appropriate hardware platform (such as a system, equipment, apparatus, device, and so on), and during the execution, it comprises one of the steps of the method embodiment or a combination thereof.

Alternatively, all or some of the steps of the abovementioned embodiments can also be implemented with integrated circuits, these steps may be made into individual integrated circuit modules respectively, or some of the modules or steps can be made into a single integrated circuit module to implement. Therefore, the present document is not limited to any specific combination of hardware and software.

Each device/functional module/functional unit in the abovementioned embodiments may be implemented with universal computing devices, they can be concentrated on a single computing device or distributed on a network composed of a plurality of computing devices.

When each device/functional module/functional unit in the abovementioned embodiments are implemented in the form of software functional module and sold or used as an individual product, they may be stored in a computer readable storage medium. The abovementioned computer-readable storage medium may be a read-only memory, magnetic or optical disk, and the like.

The above description is only specific embodiments of the present document, but the protection scope of the present document is not limited thereto, a person skilled in the art can easily think of changes or replacements within the technical scope disclosed in the present document, and these changes and replacements should fall within the protection scope of the present document. Accordingly, the protection scope of the present document should be the protection scope of the claims.

INDUSTRIAL APPLICABILITY

With the abovementioned technical solution, the path computation element can compute a frequency slot channel with central frequency determined according to the spectrum width information needed for path establishment. Therefore, the present document has very strong industrial applicability.

What is claimed is:

1. A method for a wireless local area network (WLAN) user accessing a fixed broadband network, comprising:
    a broadband network gateway (BNG) device initiating an identity authentication process to an authentication authorization accounting (AAA) server for a wireless local area network (WLAN) user;
    after the AAA server successfully authenticates the WLAN user, the BNG device acquiring a mobility identifier of the WLAN user from the AAA server;
    the BNG device allowing a mobility access of the WLAN user after receiving the mobility identifier of the WLAN user;
    wherein if the BNG device is a broadband remote access server (BRAS), the step of the BNG device allowing a mobility access of the WLAN user after receiving the mobility identifier of the WLAN user comprises:
    the BRAS enabling all local line cards in a user side to support the mobility access of the WLAN user;
    the BRAS assigning an IP address to the WLAN user;
    the WLAN user accessing a network from an AP (access point) and sending data packets;
    the AP sending the WLAN user's data packets to a BRAS;
    the AP discovering that the newly accessed WLAN user is successfully authenticated via an AC/AC cloud or the BRAS or a universal PMK key;
    the BRAS receiving the WLAN user's data packets from different physical ports and/or logical interfaces at the user side, and determining that the WLAN user who sends the data packets is a user who is allowed with the mobility access based on the MAC address and the IP address of the data packets, and forwarding the WLAN user's data packets to the network side;
    wherein, if the BRAS is a BRAS with a distributed architecture, and if a forwarding plane of line cards of the BRAS at the user side does not have the WLAN user's data, then the BRAS further checking whether the WLAN user has a mobility access authority or not via a line card controlling plane or a master controlling card plane.

2. The method of claim 1, wherein, the AAA authenticates the WLAN user by using any of the following modes, comprising Extensible Authentication Protocol (EAP) authentication, Point to Point Protocol (PPP) authentication and Portal authentication.

3. The method of claim 1, wherein, the mobility identifier is carried in an authentication success message or an authorization message.

4. The method of claim 1, wherein, the BNG device communicates with the AAA server based on a remote authentication dial-in user service (Radius) protocol, Diameter protocol or terminal access controller access-control system (Tacacs) protocol.

5. The method of claim 1, wherein, the identification information comprises at least one of a Medium Access Control (MAC) address, an internet protocol (IP) address, and a Point to Point Protocol over Ethernet (PPPoE) Session identifier (ID).

6. The method of claim 1, wherein: allowing the mobility access of the WLAN user comprises:
allowing the WLAN user to move within a coverage range of a same service line card of the BNG device; or,
allowing the WLAN user to move within a coverage range of all service line cards of the BNG device; or,
allowing the WLAN user to move within a coverage range of the BNG device and another BNG device which is a mutual backup of the BNG device; or,
allowing the WLAN user to move within the BNG pool or BNG cloud.

7. The method of claim 6, wherein, the movement of the WLAN user within the coverage range of the BNG device and another BNG device which is a mutual backup device of the BNG is achieved through a synchronization message between the BNG devices.

8. The method of claim 6, wherein, the WLAN user is allowed to move within the BNG pool or the BNG cloud through a synchronization mechanism within the BNG pool or the BNG cloud.

9. The method of claim 1, wherein, after allowing the mobility access of the WLAN user, the method further comprises:
after detecting that the WLAN user moves, the BNG device constantly billing the user by time and/or by traffic, and carrying at least one of the following information, including new user location information, new BNG user-side physical port information and new BNG user-side logical interface information, of the WLAN user in a billing packet of the WLAN user to send to a billing server.

10. A system for a wireless local area network user accessing a fixed broadband network, comprising a BNG device, wherein the BNG device comprises:
a triggering device, configured to: initiate an identity authentication process to an authentication authorization accounting (AAA) server for a wireless local area network (WLAN) user;
an acquiring device, configured to: acquire the mobility identifier of the WLAN user from the AAA server for the BNG device after the AAA server successfully authenticates the WLAN user;
a controlling device, configured to: connect to the acquiring device, and allow the mobility access of the WLAN user after receiving the mobility identifier of the WLAN user;

wherein if the BNG device is a broadband remote access server (BRAS), the controlling device is configured to connect to the acquiring device, and allow the mobility access of the WLAN user after receiving the mobility identifier of the WLAN user by:
enabling all local line cards in a user side to support the mobility access of the WLAN user;
assigning an IP address to the WLAN user;
receiving the WLAN user's data packets from different physical ports and/or logical interfaces at the user side, and determining that the WLAN user who sends the data packets is a user who is allowed with the mobility access based on the MAC address and the IP address of the data packets, and forwarding the WLAN user's data packets to the network side;
checking whether the WLAN user has a mobility access authority or not via a line card controlling plane or a master controlling card plane if the BRAS is a BRAS with a distributed architecture, and if a forwarding plane of line cards of the BRAS at the user side does not have the WLAN user's data.

11. The system of claim 10, wherein, the AAA uses any of the following modes, comprising EAP authentication, PPP authentication and Portal authentication, to authenticate the WLAN user.

12. The system of claim 10, wherein, the mobility identifier is carried in an authentication success message or an authorization message.

13. The system of claim 10, wherein, the BNG device communicates with the AAA server based on the Radius protocol, the Diameter protocol or the Tacacs protocol.

14. The system of claim 10, wherein, the identification information comprises at least one of a MAC address, an IP address, and a PPPoE Session ID.

15. The system of claim 10, wherein, the controlling device is configured to:
allow the mobility access of the WLAN user, comprising:
allowing the WLAN user to move within a coverage range of a same service line card of the BNG device; or,
allowing the WLAN user to move within a coverage range of all service line cards of the BNG device; or,
allowing the WLAN user to move within a coverage range of the BNG device and another BNG device which is a mutual backup of the BNG device; or,
allowing the WLAN user to move within the BNG pool or the BNG cloud.

16. The system of claim 15, wherein, the movement of the WLAN user within the coverage range of the BNG device and another BNG device which is a mutual backup device of the BNG can be achieved with a synchronization message between the BNG devices.

17. The system of claim 15, wherein, the WLAN user is allowed to move within a BNG pool or a BNG cloud according to a synchronization mechanism within the BNG pool or the BNG cloud.

18. The system of claim 10, wherein, the BNG device further comprises:
a billing device, configured to: after detecting that the WLAN user moves, keep billing the user by time and/or by traffic, and carry at least one of the following information, including new user location information, new BNG user-side physical port information and new BNG user side logical interface information, of the WLAN user in a billing packet of the WLAN user and send the billing packet to the billing server.

* * * * *